US009398493B2

(12) United States Patent
Ore

(10) Patent No.: US 9,398,493 B2
(45) Date of Patent: Jul. 19, 2016

(54) METHOD, APPARATUS, AND SYSTEM PROVIDING OPERATOR CONTROLLED MOBILITY FOR USER EQUIPMENT

(75) Inventor: Ivan Ore, Nummela (FI)

(73) Assignee: Nokia Technologies Oy, Espoo (FI)

( * ) Notice: Subject to any disclaimer, the term of this patent is extended or adjusted under 35 U.S.C. 154(b) by 1044 days.

(21) Appl. No.: 12/447,598

(22) PCT Filed: Oct. 29, 2007

(86) PCT No.: PCT/IB2007/003257
§ 371 (c)(1),
(2), (4) Date: Jun. 4, 2010

(87) PCT Pub. No.: WO2008/053314
PCT Pub. Date: May 8, 2008

(65) Prior Publication Data
US 2010/0255849 A1  Oct. 7, 2010

Related U.S. Application Data

(60) Provisional application No. 60/855,228, filed on Oct. 30, 2006.

(51) Int. Cl.
*H04W 28/18* (2009.01)
*H04W 72/00* (2009.01)
*H04W 48/08* (2009.01)
*H04W 48/16* (2009.01)
*H04W 88/06* (2009.01)

(52) U.S. Cl.
CPC ............. *H04W 28/18* (2013.01); *H04W 48/08* (2013.01); *H04W 48/16* (2013.01); *H04W 88/06* (2013.01)

(58) Field of Classification Search
None
See application file for complete search history.

(56) References Cited

U.S. PATENT DOCUMENTS

| 5,903,832 | A | 5/1999 | Seppanen et al. | 455/414 |
| 5,915,214 | A | 6/1999 | Reece et al. | 455/406 |
| 6,560,460 | B1 | 5/2003 | Horneman et al. | 455/452 |
| 6,671,507 | B1 * | 12/2003 | Vinck | 455/411 |

(Continued)

FOREIGN PATENT DOCUMENTS

| WO | WO 02065808 A1 * | 8/2002 | H04Q 7/38 |
| WO | WO 2008/053314 A3 | 5/2008 | |

OTHER PUBLICATIONS

3GPP TSG SA WG2 Architecture—Sae Ad-Hoc, "Introducing Operator Policy Control in Inter-3GPP Mobility in Idle Mode", (Aug. 23-26, 2006), S2-062659, (4 pages).

(Continued)

*Primary Examiner* — Kent Chang
*Assistant Examiner* — Benjamin Morales Fernandez
(74) *Attorney, Agent, or Firm* — Harrington & Smith

(57) ABSTRACT

A method for operator controlled mobility for user equipment is described. The method includes assigning a set of radio access technologies from a plurality of radio access technologies to a user equipment. The set of radio access technologies is assigned based at least in part on a subscribed level of service corresponding to the user equipment. An indication of the assigned set of radio access technologies is signaled to the user equipment. The user equipment generates a measurement report for a subset of a neighbor cell list. The subset represents radio access technologies in the neighbor cell list that are also in the set of assigned radio access technologies. The measurement report is transmitted to the base station. Apparatus are also described.

18 Claims, 12 Drawing Sheets

(56) References Cited

U.S. PATENT DOCUMENTS

| | | | |
|---|---|---|---|
| 2002/0087674 A1 | 7/2002 | Guilford et al. | 709/223 |
| 2002/0197992 A1* | 12/2002 | Nizri et al. | 455/435 |
| 2003/0064718 A1* | 4/2003 | Haines et al. | 455/423 |
| 2006/0133311 A1* | 6/2006 | Drevon et al. | 370/328 |
| 2006/0199536 A1* | 9/2006 | Eisenbach | 455/41.2 |
| 2007/0171879 A1* | 7/2007 | Bourque | 370/338 |
| 2007/0232276 A1* | 10/2007 | Andersson | 455/414.1 |
| 2008/0020775 A1* | 1/2008 | Willars | 455/445 |
| 2008/0168030 A1* | 7/2008 | Songer | 707/3 |
| 2009/0215447 A1* | 8/2009 | Catalano et al. | 455/432.1 |

OTHER PUBLICATIONS

3GPP TS 23.122 V7.6.0 (Sep. 2006), Technical Specification, "$3^{rd}$ Generation Partnership Project; Technical Specification Group Core Network and Terminals; Non-Access-Stratum (NAS) Functions Related to Mobile Station (MS) in Idle Mode", (Release 7), (34 pages).

3GPP TS 36.300 V8.2.0 (Sep. 2007), Technical Specification, $3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), (109 pages).

* cited by examiner

| SUBNETWORK | TERRITORY A | TERRITORY B | TERRITORY C | TERRITORY D |
|---|---|---|---|---|
| GSM900 | X | | | |
| GSM1800 | X | | | |
| 3G CARRIER=10765 | X | X | | |
| 3.5G CARRIER=10766 | | X | | |
| LTE (20MHz) CARRIER XX | | | X | |
| LTE (10MHz) CARRIER YY | | | X | X |
| LTE (1.25MHz) CARRIER ZZ | | X | | |

FIG.4

| SUBSCRIPTION | SERVICE | TECHNOLOGY | DESCRIPTION |
|---|---|---|---|
| VOICE ONLY | VOICE ONLY | GSM | VOICE CALLS WILL CONTINUE TO BE THE MOST POPULAR WIRELESS SERVICE. VOICE ONLY SERVICE COULD BE OFFERED FOR NORMAL CONSUMERS AND SMALL BUSINESSES REQUIRING CHEAP VOICE CALL SOLUTIONS AND CHEAP TERMINALS AND COMMUNICATION ANYWHERE |
| SILVER CLASS MEDIUM SPEED DATA CONNECTION | DATA + VOICE | 3G/2G | SILVER CLASS OFFERS A MEDIUM SPEED DATA CONNECTION PROVIDED BY e.g., 3.5G/2.5G TERMINALS WITH THIS KIND OF SUBSCRIPTION SHOULD CAMP ON EITHER 2G OR 3G, EVEN IF THEIR TERMINAL IS LTE CAPABLE. CAMPING ON LTE SHOULD GENERALLY NOT BE ALLOWED |
| GOLD CLASS 1 HIGH DATA CONNECTION | DATA + VOICE | ALL LTE (f1) (e.g. BW OF f1=1.25 MHz) | GOLD CLASS 1 OFFERS A HIGH SPEED DATA CONNECTION PROVIDED BY LTE AND HAVING 2G/3G TECHNOLOGY AS BACK-UP NETWORKS. CELL RESELECTION SHOULD PREFER CAMPING ON FREQUENCY LTE f1 OR IN 3G/2G. CAMPING ON CELL WITH HIGHER BWs (LTE f2) IS TYPICALLY NOT ALLOWED |
| GOLD CLASS 2 VERY HIGH DATA CONNECTION | DATA + VOICE | ALL LTE (f2) (e.g. BW OF f2=10 MHz) | GOLD CLASS 2 OFFERS A VERY HIGH SPEED DATA CONNECTION PROVIDED IN LTE f2 AND HAVING LTE f1 AND 2G/3G TECHNOLOGY AS BACK-UP NETWORKS. CELL RESELECTION SHOULD PREFER CAMPING ON FREQUENCY f2. IF NO f2 IS AVAILABLE, CELL RESELECTION SHOULD SEARCH OTHER NETWORKS IN PRIORITY ORDER: f1,3G,2G |

FIG.7

METHOD, APPARATUS, AND SYSTEM PROVIDING OPERATOR CONTROLLED MOBILITY FOR USER EQUIPMENT

RELATED APPLICATION

This application was originally filed as PCT Application No. PCT/IB2007/003257 filed 29 Oct. 2007 which claims priority to U.S. Patent Application No. 60/855,228 filed 30 Oct. 2006.

TECHNICAL FIELD

This invention relates generally to wireless networks and, more specifically, relates to providing services to user equipment on the wireless networks.

BACKGROUND

The following abbreviations are herewith defined:

| | |
|---|---|
| 3G | third generation |
| 3GPP | third generation partnership project |
| E-UTRAN | evolved UTRAN (also known as LTE or 3.9G) |
| GSM | global system for mobile communications |
| HLR | home location register |
| LTE | long term evolution |
| NCL | neighbor cell list |
| Node-B | base station |
| QoS | quality of service |
| RAT | radio access technology |
| UE | user equipment |
| UTRAN | universal terrestrial radio access network |

A proposed communication system known as evolved UTRAN (E-UTRAN, also referred to as UTRAN-LTE, LTE or as E-UTRA) is currently under discussion within the 3GPP. One specification of interest is 3GPP TS 36.300, V8.2.0 (2007-09), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8), which is incorporated by reference herein.

Significant changes are occurring in wireless networks such as digital cellular networks. First there was GSM, implementing one radio access technology (RAT) used in a network, which focused initially in voice service only. Later, GSM evolved to 2.5G (generation 2.5) providing low bit rate data connections. After this, 3G (third generation) networks, implementing another RAT (or RATs), were launched with the intention to satisfy users by offering medium data rates of few hundreds of kbps (kilobits per second). 3.5G (generation 3.5), implementing HSPA (high speed packet access) and yet another RAT, was quickly developed as an enhancement of 3G and the ability to provide the first true broadband data rates, e.g., in the order of 1 Mbps (megabits per second).

Currently, the standardization of Long Term Evolution (LTE), also known as 3.9G, is being considered, which implements yet other RATs. The LTE is capable of delivering wireless broadband access at high bit rates similar to or higher than the rates offered in fixed (e.g., wired) networks. LTE is built as a flexible network with different frequencies and corresponding bandwidths. This means that different kind of networks can be built inside LTE with different network capacities (e.g., in terms of bit rate, loading, etc). For example, LTE (10 MHz) or LTE (20 MHz), where MHZ is megahertz, can be offered according to the demands of high bit rate and capacity.

Although the new networks offer advantages, there are as yet unresolved problems based on the coexistence of the new and old RATs.

U.S. Patent Publication 2002/0087674 A1, U.S. Pat. No. 5,903,832, and U.S. Pat. No. 5,915,214 describe systems for network selection. However, the systems described do not consider the subscription level of the user and which RATs the user has access to in accordance to their subscription level.

SUMMARY

An exemplary embodiment in accordance with this invention is a method for operator controlled mobility for user equipment. The method includes assigning a set of radio access technologies from a plurality of radio access technologies to a user equipment. The set of radio access technologies is assigned based at least in part on a subscribed level of service corresponding to the user equipment. An indication of the assigned set of radio access technologies is signaled to the user equipment.

Another exemplary embodiment in accordance with this invention is an apparatus for operator controlled mobility for user equipment. The apparatus includes a processor to assign a set of radio access technologies from a plurality of radio access technologies to a user equipment. The set of radio access technologies is assigned based at least in part on a subscribed level of service corresponding to the user equipment. The apparatus also includes a transmitter to signal an indication of the assigned set of radio access technologies to the user equipment.

A further exemplary embodiment in accordance with this invention is an apparatus for operator controlled mobility for user equipment. The apparatus includes a means for assigning a set of radio access technologies from a plurality of radio access technologies to a user equipment. The set of radio access technologies is assigned based at least in part on a subscribed level of service corresponding to the user equipment. The apparatus also includes a means for signaling an indication of the assigned set of radio access technologies Another exemplary embodiment in accordance with this invention is a method for controlling user equipment. The method includes receiving a prioritized set of assigned radio access technologies. A measurement report is generated for a subset of a neighbor cell list. The subset represents radio access technologies in the neighbor cell list that are also in the set of assigned radio access technologies. The measurement report is transmitted to a base station.

A further exemplary embodiment in accordance with this invention is an apparatus for using operator controlled mobility of user equipment. The apparatus includes a receiver to receive a prioritized set of assigned radio access technologies. A processor generates a measurement report for a subset of a neighbor cell list. The subset represents radio access technologies in the neighbor cell list that are also in the set of assigned radio access technologies. The apparatus also includes a transmitter to transmit the measurement report to a base station.

Another exemplary embodiment in accordance with this invention is an apparatus for using operator controlled mobility of user equipment. The apparatus includes a means for receiving a prioritized set of assigned radio access technologies where the user equipment is allowed to access during mobility procedures in idle and active mode. The apparatus also includes a means for generating a measurement report for a subset of a neighbor cell list, RAT list or carrier frequency list. The subset represents radio access technologies in the neighbor cell list that are also in the set of assigned radio access technologies. The apparatus also includes a means for transmitting the measurement report to a base station.

BRIEF DESCRIPTION OF THE DRAWINGS

The attached Drawing Figures include:

FIG. 4 is an example of territories assigned to UE inside of a wireless network.

FIG. 7 illustrates a use case of a service offering supported potentially by a number of RATs;

DETAILED DESCRIPTION OF EXEMPLARY EMBODIMENTS

As described above, the standardization of a new radio access technology referred to as LTE is being considered. Despite the fact that new cellular networks, with new RATs, are being launched commercially, operators are still utilizing their old networks. For example, many 3G operators use GSM. The same trend is expected in LTE: LTE operators will keep their old networks (e.g., GSM, 2.5, 3G, 3.5G). As the new technology is being implemented in the operator's coverage area, it may be expected to have different technologies providing coverage in the same area. For example, years after LTE is launched, it is expected that there will be GSM, 3G, and LTE coverage in the same access areas.

Mobility and network access has been radio driven:

In UMTS (Universal Mobile Telecommunications System) cell reselection, a user equipment (UE) stays in the 3G radio access technology (RAT) as long as there is coverage. Only when 3G coverage vanishes does a UE transfer to the radio access technology of GSM. This means that a subscriber using a 3G phone will "camp" on 3G unless 3G coverage vanishes. Because cell reselection favors camping on the "newest" (i.e., implemented most recently) radio access technology, this causes camping loading and traffic loading to accumulate in the newest radio access technology.

In terms of coverage between cells, a handover is also based on radio conditions. The network directs handovers to another target cell based on radio conditions. A concept such as handover to a "home" radio access network does not exist.

There may be cell reselection to another radio access technology or cell reselection inside the same radio access technology. Handover to another carrier (e.g., within the same cell) is also possible due to load reasons.

Figure 1:
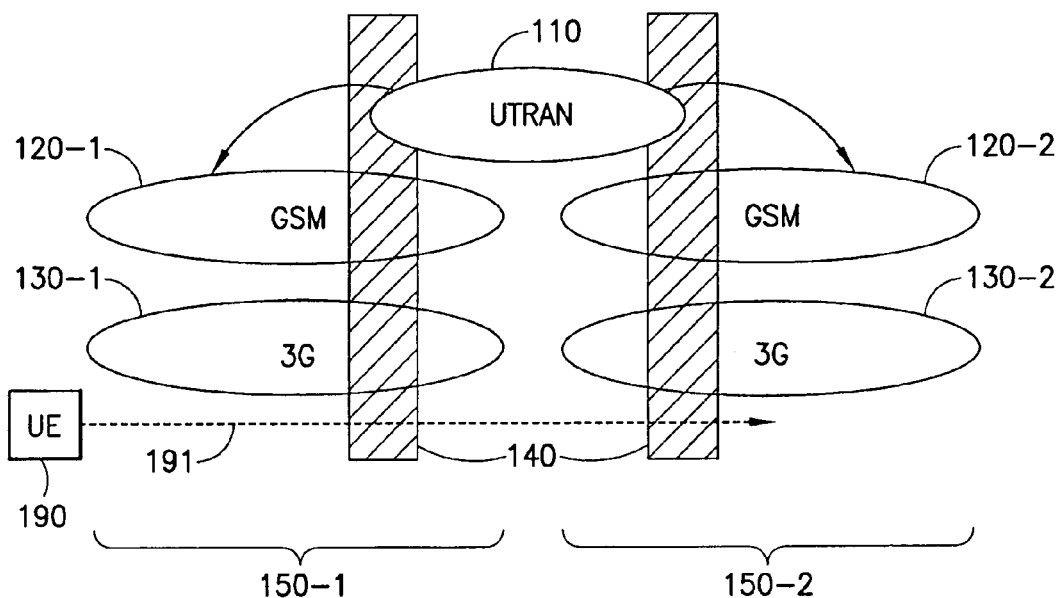
FIG. 1 is a diagram of mobility between RATs when a UE transfers between coverage boundaries.

For instance, turning to FIG. 1, a diagram is shown of mobility between RATs when a UE 190 transfers between coverage boundaries as the UE 190 follows path 191. When a UE 190 is moving, there will be a certain area 140 that is a coverage boundary and the UE 190 will communicate with the UMTS (Universal Mobile Telecommunications System) Terrestrial Radio Access Network (UTRAN) 110 as to whether the UE 190 will remain on one of the RATs, GSM or 3G. For instance, assume the UE 190 is currently on the radio access technology of 3G 130-1 and the access area 150-1 has both RATs of GSM 120-1 and 3G 130-1. The access area 150-2 has RATs of GSM 120-2 and 3G 130-2. As noted above, the UE may "camp" on the 3G 130, meaning that the UE 190 will remain on the radio access technology of 3G 130 by transferring from 3G 130-1 to 3G 130-2, which may lead to too high a traffic loading on the radio access technology 3G 130-2. Furthermore, the UE 190 can only choose between the RATs 3G 130 and GSM 120 during these handovers. The selection is based on signal strength and also some other parameters provided by the RAN (radio access network, e.g., UTRAN 110). The selection in idle mode is typically based on cell reselection criteria.

It is noted that a radio access technology is typically at least some combination of schemes, e.g., multiplexing scheme and modulation scheme, and may include carrier frequency, spreading codes, and the like. As 3G, GSM, and LTE (for instance) are defined by standards, the multiplexing scheme, modulation scheme, carrier frequency, and other variables are predetermined and can be used to distinguish the underlying RATs used by the systems. Consequently, the term "radio access technology" will be used herein to describe a 3G, GSM, or LTE (or other) system, although it is to be understood that the radio access technology itself is defined by variables.

Operators owning and using different RATs do not have a proper way of taking advantage of the rich technology diversity that they own in order to provide different service subscriptions (e.g., such as service levels). This may be due to idle mode and dedicated mode functionality only considering the radio coverage conditions as the main reason of changing mobility. This is not valid in 3G and 2G, as both technologies are currently offered with similar coverage conditions.

What it is required is a new way of providing mobility based on some type of "offered capacity" in areas where different RATs are offered in an area and accessible by a UE.

Figure 2:
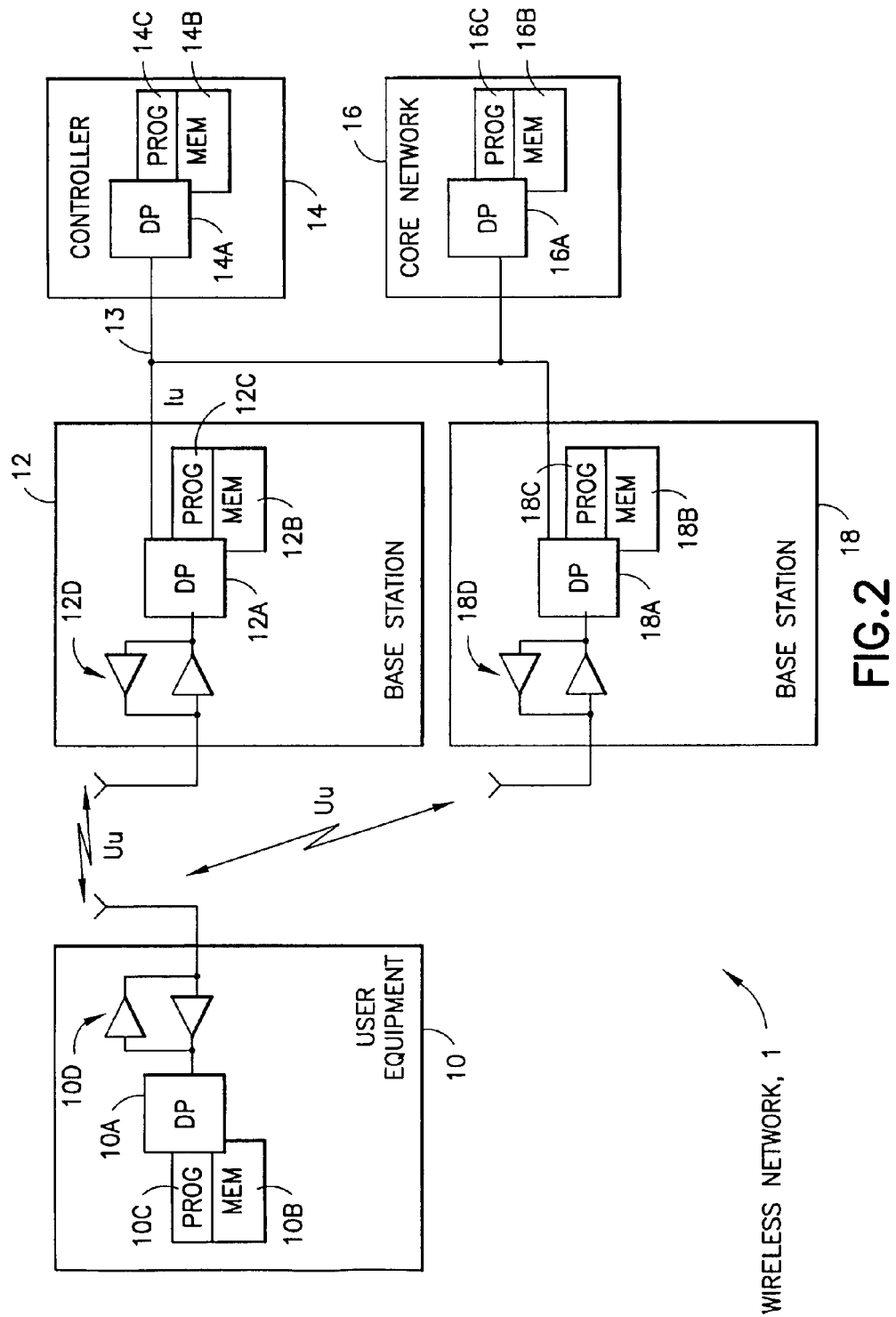
FIG. 2 is an exemplary block diagram of a wireless network.

Reference is made to FIG. 2 for illustrating a simplified block diagram of various electronic devices that are suitable for use in practicing the exemplary embodiments of this invention. In FIG. 2, a wireless network 1 includes a UE 10, a base station 12 and a controller 14 for the wireless network 1. The UE 10 includes a data processor (DP) 10A, a memory (MEM) 10B that stores a program (PROG) 10C, and a suitable radio frequency (RF) transceiver 10D for bidirectional wireless communications with the base station 12, which also includes a DP 12A, a MEM 12B that stores a PROG 12C, and a suitable RF transceiver 12D.

In this example, the UE 10 is able to communicate with two base stations 12 and 18. The data path 13 also interconnects the controller 14 and the core network (CN) 16, which also includes a DP 16A, and MEM 16B that stores a PROG 16C. The base station (e.g., Node B) 18, which also includes a DP 18A, a MEM 18B that stores a PROG 18C, and a suitable RF transceiver 18D.

The base stations 12 and 18 are coupled via a data path 13 to the controller 14 that also includes a DP 14A and a MEM 14B storing an associated PROG 14C. As shown in FIG. 2, there is a radio interface between the base station 12 and the UE 10.

For GSM, the base station 12 may include one or more base transceiver stations and a base station controller; the controller 14 may be a network and switching subsystem that includes, e.g., a mobile switching center (and visitor location center), a home location register (HLR), and a gateway mobile switching center. The core network can include an operation subsystem. GSM implements the radio access technology of, e.g., a TDMA (time division multiple access) multiplexing scheme that generally uses a Gaussian minimum-phase shift keying modulation.

For 3G, the base station 12 includes a Node B, the controller 14 includes a radio network controller (RNC), and the core network 14 includes, e.g., a mobile servicing center/visitor location register, a signaling system seven, a HLR, and a serving GPRS (general packer radio system) support node. The 3G typically implements the radio access technology of, e.g., CDMA (code division multiple access) multiplexing and quadrature phase shift keying and binary phase shift keying modulation schemes. However, some 3G systems implement a RATs including a combination of TDMA, CDMA, FDMA (frequency division multiple access), and even SDMA (space diversity multiple access) and may use other modulation schemes.

Figure 3:
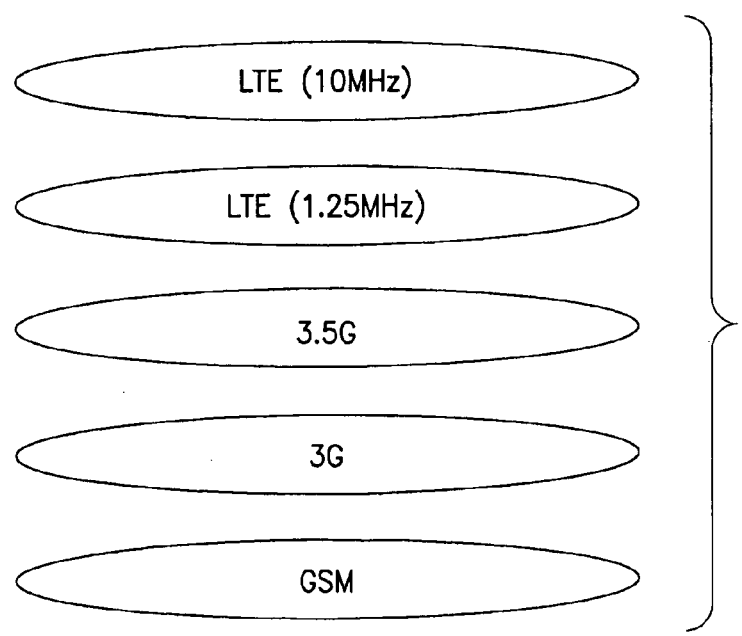
FIG. 3 is an example of a number of different RATs from which an operator can choose.

Each of the base stations 12, 18 implements a set of RATs (e.g., as shown in FIG. 3 and described below). One exemplary aspect of the disclosed invention is directed to how the UE 10 may be transferred from one access area (e.g., serviced by base station 12) to another access area (e.g., serviced by base station 18), where each access area includes one or more cells and each cell corresponds to a radio access technology. Another exemplary aspect is what set of RATs will be assigned to the UE 10 for a particular base station 12 or 18 based on, e.g., a service level subscribed to by the UE 10. Yet another exemplary aspect is which RATs (e.g., and corresponding carrier frequencies) the UE 10 will examine (e.g., for power levels) as the UE 10, e.g., prepares for or anticipates handover or cell reselection. These concepts are described in more detail below.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Certain embodiments of this invention may be implemented by computer software executable by the DP 10A of the UE 10 and the other DPs, or by hardware, or by a combination of software and hardware. The MEMs 10B, 12B, 14B, 16B, and 18B may be of any type suitable to the local technical environment and may be implemented using any suitable data storage technology, such as semiconductor-based memory devices, magnetic memory devices and systems, optical memory devices and systems, fixed memory and removable memory. The DPs 10A, 12A, 14A, 16A, and 18A may be of any type suitable to the local technical environment, and may include one or more of general purpose computers, special purpose computers, microprocessors, digital signal processors (DSPs) and processors based on a multi-core processor architecture, as non-limiting examples. The MEMs 10B, 12B, 14B, 16B, and 18B may contain machine-readable instructions from computer program product tangibly embodying a program of the machine-readable instructions, which are executable by at least one data processor 10C, 12C, 14C, 16C, 18C to perform operations described herein. Such a computer program product may include a compact disk (CD), digital versatile disk (DVD), memory stick, or any other product suitable for containing a program of machine-readable instructions.

Turning to FIG. 3, an example is shown of a number of different RATs from which an operator can choose. As described above, new RATs may be added in the future to the operator's network. However, old radio access will still be used. The operator is the entity that runs the network, bills the user, etc. Coverage of the latest RATs are expected to reach similar areas, after some years of initial rollout, that are serviced by old RATs. As shown in FIG. 3, a situation may arise where the operator can choose between LTE (10 MHz), LTE (1.25 MHz), 3.5G, 3G, and GSM in order to provide services to a user and associated UE. Coverage based mobility does not have much applicability in the scenario shown in FIG. 3. A new mobility concept is required to allow full UE mobility across different RATs, e.g., as defined partially by frequency bands specified by the operator.

An aspect of the invention herein allows the operator to assign UE a specific "territory" inside the cellular network. The territory includes a set of sub-networks. Subnetworks include not only specific RATs but also may include frequency bands (e.g., as defined by carrier frequencies), where applicable. FIG. 4 is an example of territories assigned to UE inside of a wireless network.

The UE (e.g., UE 10 of FIG. 2) is made aware of its allowed "territory" (e.g., allowed sub-network, which can be integrated by many radio access technology combinations defined by the operator). The UE will be allowed to move only on the "home" sub-network, although it may be that for exceptional cases (e.g. emergency calls, etc.) the UE may be obligated to use other sub-networks for temporary use. The flexibility therefore exists for the UE to connect to other networks rather than the home sub-network if coverage is poor, etc.

The definition of the sub-network is the responsibility of the operator. Also an application (e.g., of the operator) defines what is meant by home sub-network. The home sub-network is not a PLMN (public land mobile network) but is instead a sub-network inside the PLMN. An exemplary benefit of the disclosed invention is that that the operator can control the UE capabilities or the allowed RATs/bands/frequency carriers via signaling. By controlling the capabilities of the UE, the sub-networks are defined. Once the sub-networks are defined, the operator is capable of managing the network resources more efficiently and also offering different wireless service subscriptions. Such variety of service subscriptions may be classified, e.g., according to their capacity capability (e.g., as indicated by bandwidth). Some sub-networks will have a higher subscription price than others due to the higher offered capacity (e.g.; throughput). The concept of offering services via different sub-network capabilities is somewhat similar to what DSL (digital subscriber line) operators offer: A DSL subscriber can choose between different offered bit rates (e.g., 500 kbps, 1 Mbps). However, DSL uses the same technology to support the different offered bit rates, whereas the disclosed invention uses a variety of different RATs to support the service subscription.

FIG. 4 shows an example of how these services can be used by an operator. The territories in FIG. 4 are not geographic territories but instead are a collection of access networks on which the UE can move. The RATs could be 3G, 2.5G, 3.5G, etc. The same radio access technology can be offered in different frequencies (e.g., defined by carrier frequencies) at the same time. In an exemplary embodiment, a UE cannot access different territories according to the service type (such as voice or data or a combination). Instead, the territory(ies) are subscription based and users only are able to access the territory or territories to which they subscribed.

It can be seen that the Territory B (e.g., a sub-network including a set of RATs including 3G, carrier 10765, and 3G, carrier 10766, and LTE 1.25 MHz, carrier ZZ) can provide a level of service (e.g., as determined by data rate) for a UE that is greater than the level of service that can be provided by Territory A (e.g., a sub-network including a set of RATs including GSM900, GSM1800, and 3G, carrier 10765). Similarly, Territory C can provide a highest level of service (e.g., as determined by data rate) for a UE that is greater than the levels of service that can be provided by Territories A, B, and D.

Figure 5:
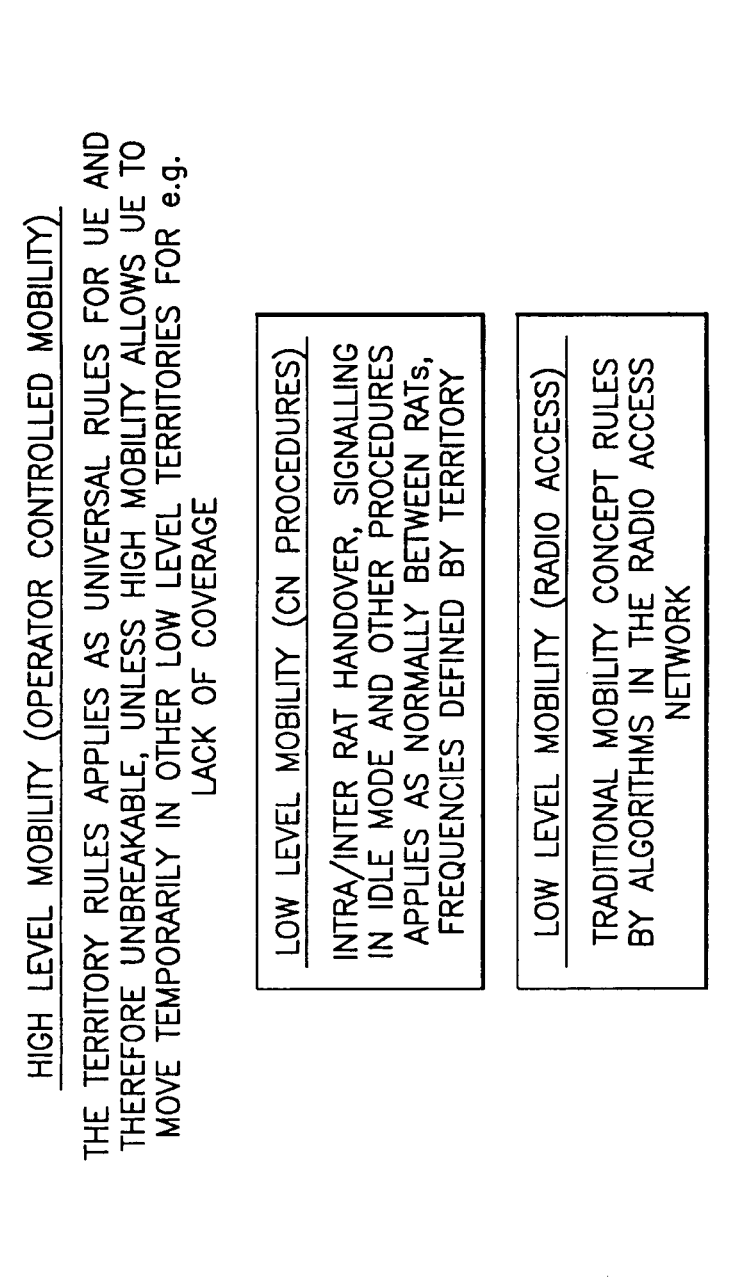
FIG. 5 is a block diagram of relationships between operator controlled mobility for UE and traditional idle mode procedures and handovers.

Turning now to FIG. 5, a block diagram is shown of relationships between operator controlled mobility for UE and traditional idle mode procedures and handovers. In the disclosed invention, the overall mobility in cellular networks can be divided, in an exemplary embodiment, in two levels: High level mobility, which is operator controlled; and low level mobility, which is sub-divided into mobility procedures/algorithms in radio access (e.g., controlled by a base station 12, 18 of FIG. 2) and core network (e.g., core network 16 of FIG. 2). In FIG. 5, the acronym "RAT" stands for "radio access technology".

FIG. 5 therefore shows an implementation of a subscription based approach. If the network offers some service level, e.g., voice in 3G and data in 3.5G, and a territory to which a user is subscribed includes 3G and 3.5G, and then the UE will follow that rule. But if the operator does not have any rule about which service the UE should use in 3G or 3.5G, then UE may follow conventional procedures. Typically, therefore, the UE does follow the normal procedures inside the territories. A better way to understand this idea is that operator can "modify the UE capability" properties via subscriptions. So if a UE supports 2G, 3G, 3.5G and LTE, if the operator assigns a territory including 3G and 3.5G, then the operator will modify the capabilities of the UE so that the UE will only use a restricted capability (e.g., possibly considering only 3G and 3.5G). It is noted that different carriers can also be included, e.g. 3G (frequency 1), 3G (frequency 2).

Because a UE may now be assigned a "territory" including a number of RATs, the UE will now have to examine measurements such as power levels from a variety of RATs. Typically, a neighbor cell list (NCL) is created for cells for which communication can be performed. In a conventional system, the highest power cell is generally chosen as a new cell when the UE transfers between cell boundaries.

For the creation of the NCL, the operator can create the NCL for each cell, as traditionally. UE/network using the high level mobility shown in FIG. 5 only considers the neighbor cells that belong to the assigned territory. A UE not using high level mobility (e.g., "normal mode") can use all the neighbors included in the NCL, as is traditional. Note: In LTE it was agreed that the NCL is not mandatory for intra-frequency mobility. Inter-frequency mobility may rely on the NCL or frequency carrier information. A simplified version of an NCL may be used, in accordance with this invention.

Figure 6:
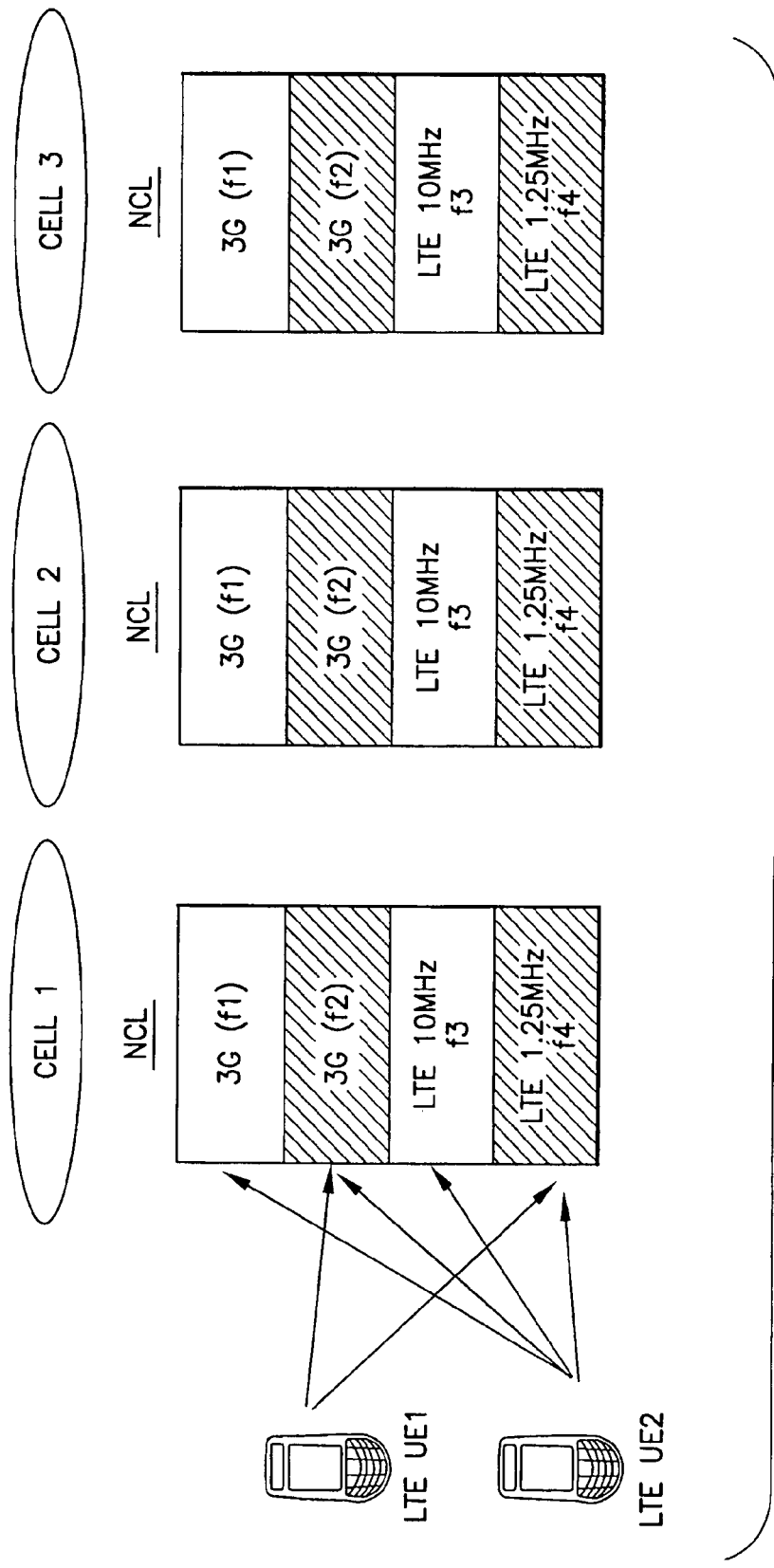
FIG. 6 is a block diagram illustrating neighboring cell measurements by UE that use the operator controlled mobility of an exemplary embodiment of the disclosed invention.

As an example, consider FIG. 6, which illustrates neighboring cell measurements by UE that use the operator controlled mobility of an exemplary embodiment of the disclosed invention. In this example, the UE1 with the assigned territory including the RATs LTE 1.25 Mhz (f4) and 3G (f2) only considers the neighbors defined in the corresponding NCL. The UE2, operating in normal mode, uses all the neighbors defined in the NCL.

The operator controlled mobility as described herein has benefits for many different types of RATs. For instance, LTE will provide several access capabilities (1.25 Mhz, 5 Mhz, 10 Mhz, 20 Mhz) and thus operator controlled mobility implemented in LTE only is quite attractive. Procedures to introduce territory information from the core network (e.g., core network 16 of FIG. 2) to the UE such as UE 10 may be defined. Mobility in a radio access network (e.g., cell reselection/handover) may take into account the universal rules commanded by operator under the operator controlled mobility.

Concerning 3G/2G, updates for these RATs in order to incorporate the operator controlled mobility may be needed in the UE (e.g., for high level mobility as shown in FIG. 5) and thus support may be provided in LTE capable terminals with 3G/2G legacy. The layer L1 changes in UE may also be needed in order to accept inter-RAT measurement command definitions (e.g., measure specific LTE bands or specific GSM bands only). Changes in the core network may be included for sending high level mobility information (e.g., territories) to the UE. Subscription information updates in HLR may also be provided.

Figure 12:
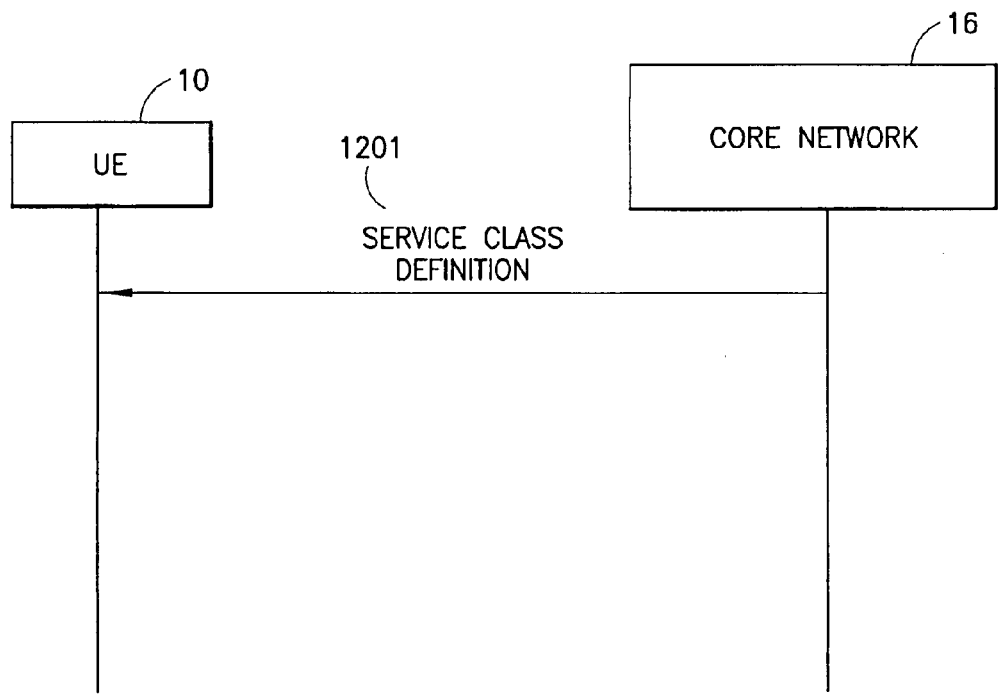
FIG. 12 is a block diagram of real-time service class update.

Information about which user is subscribed to which service subscription is stored in the core network (the information may be stored in any number of places, e.g., HLR). The UE may be made aware of its service subscription level (e.g., which corresponds to which RATs the UE is allowed to access). This information may be provided to UE, e.g., via SIMCARD, real-time, or using some other technique. A real-time service class update is shown in FIG. 12, where the core network 16 sends a service class update via service class definition message(s) 1201 to the UE 10. The service class definition message(s) 1201 include at least an indication of the set of RATs the UE is allowed to access. The service class definition message(s) 1201 may also include other information. Typically, the UE 10 camps on and accesses only those cells that belong to the RATs included in the service class definition. In an exemplary embodiment, the UE 10 always tries to camp on the best radio access technology defined in the service class definition.

FIG. 7 illustrates a use case of a service offering supported potentially by a number of RATs. Service subscriptions are the service offerings for this operator. The subscriptions in FIG. 7 are, in an exemplary embodiment, the service classes used herein. The subscriptions range (in terms of, e.g., provided bandwidth and/or quality of service (QoS)) from voice only to Gold class 2 (two). The sub-networks include the radio access technology GSM for the service class of "voice ONLY", which corresponds to the "voice only" service. The sub-networks also include the RATs 3G/2G, which corresponds to the "data+voice" service at a service class of "silver class", the RATs of GSM, 3G/2G, and LTE (f1) for "data+voice" at a the service class of gold class 1, and the RATs of GSM, 3G/2G, and LTE (f2) (e.g., and f1) for "data+voice" at a service class of gold class 2.

As used herein, "service class" is not limited to voice, video, streaming etc. Instead, a "service class" is a package sold to the subscriber that includes delivery of RATs (and associated access networks). It is noted that a radio access network implements a radio access technology.

Figure 8:
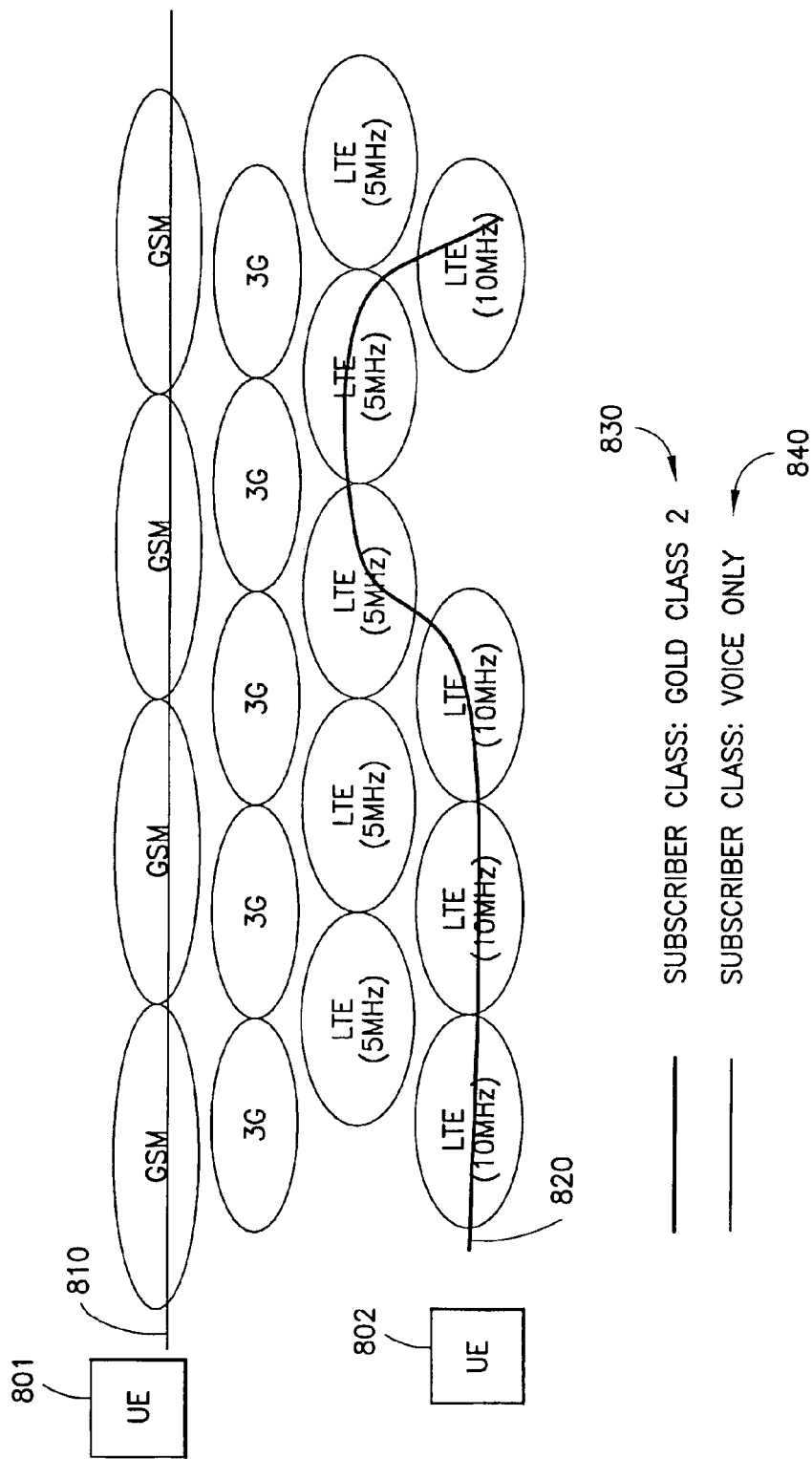
FIG. 8 illustrates how access changes for two UE that have two different service offerings during movement of the UE between cells.

Referring now to FIG. 8, this figure illustrates how access changes for two UE, that have two different service offerings, during movement of the UE between cells. The example shows two subscribers having corresponding UE (UE) 802, 801 and having subscriber classes 830, 840, respectively. Also shown are the paths 810, 820 the UE 801, 802 take (respectively).

The subscriber with the "Gold class 2" subscription 830 is allocated LTE bandwidth 10 Mhz. This is the best "connection line" that the operator is able to offer, which is characterized by high throughput due to the large bandwidth used (e.g., 10 Mhz) and offers less interference (e.g., not many users are allocated in this high class sub-network). Due to the high price of this connection, this sub-network is attractive to business people, corporate users, and for users demanding high broadband access. As also shown in the figure, in areas where LTE 10 Mhz coverage is null (i.e., there is no LTE 10 MHz coverage), the UE 802 may be provided with a back-up radio access (LTE 5 Mhz), as described by the territory defined for the UE 820 and its associated service class. When LTE 10 Mhz coverage is recovered, the UE 802 again selects (e.g., in cooperation with a wireless network) this radio access technology.

The operator controlled mobility also allows the operator to offer simple connections such as "voice only", as indicated by subscriber class 840. This service subscription is relatively inexpensive and is expected to attract people who are not interested in data applications. Small business can also be interested in this service, as will people who work outdoors. Operator benefits of this connection (i.e., service class 840) include allocation of certain subscribers to "old" access networks (e.g., RATs), which reduces the load in other radio access networks (e.g., RATs).

Figure 9:
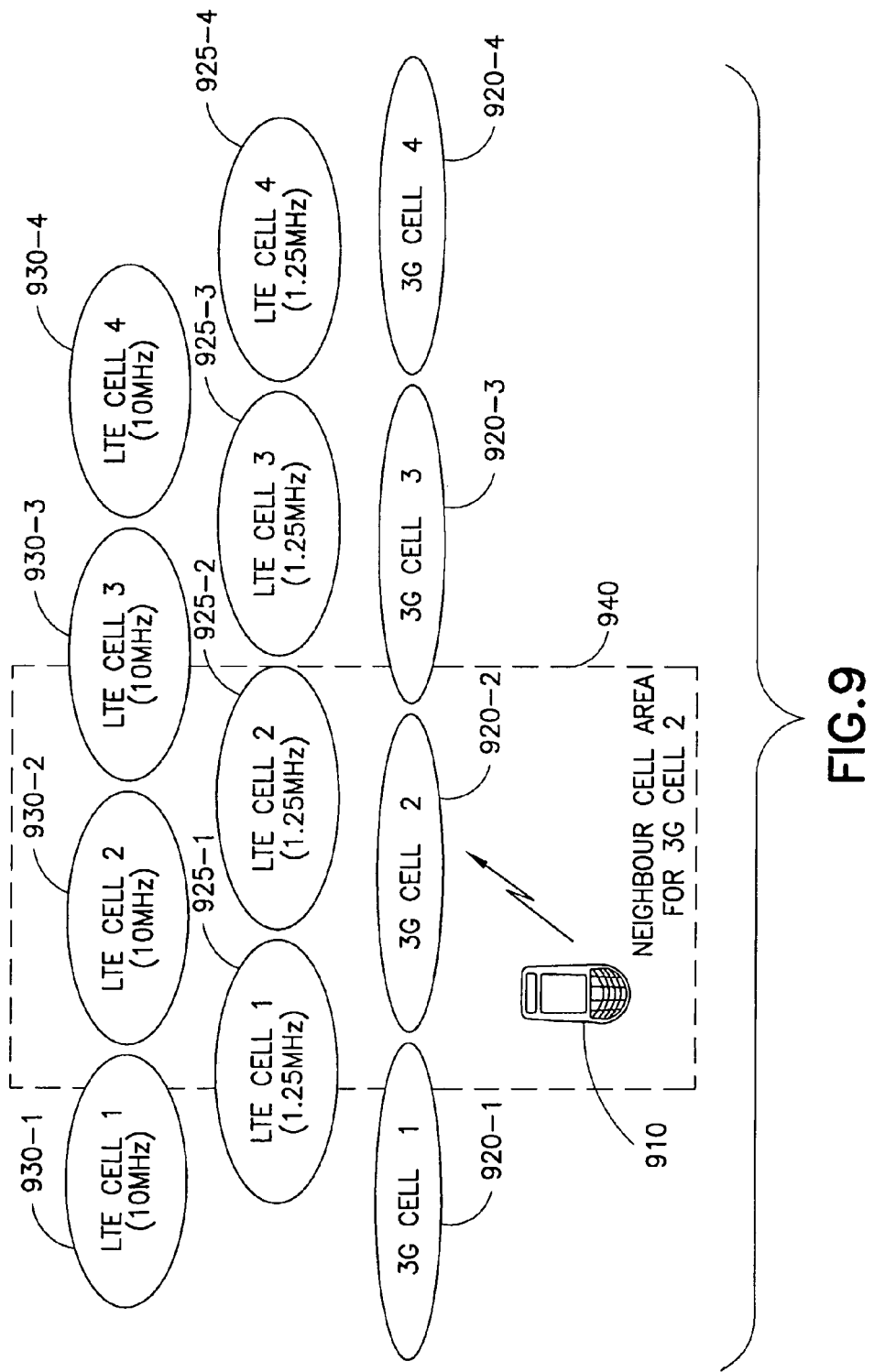
FIG. 9 illustrates neighbor cell area and how this may affect operator controlled mobility.

Turning now to FIG. 9, there is illustrated a neighbor cell area and how this may affect operator controlled mobility. In the example of FIG. 9, there are a number of cells 920-1 through 920-4 for 3G, a number of cells 925-1 through 925-4 for LTE (1.25 MHz), and a number of cells 930-1 through 930-4 for LTE (10 MHz). Within the neighbor cell area 940, the UE 910 can access a number of different cells 930-1 through 930-3, 925-1, 925-2, and 920-1 through 920-3.

Traditionally, the neighbor cell area (determined by the NCL) for a given cell should be explicitly specified in the serving cell. In the example, neighbor cell area 940 for 3G cell 2 includes many neighbors from different RATs. Thus, a definition of NCL list via traditional methods may be limiting. Instead, as part of one exemplary embodiment of the proposed mobility concept, a simpler NCL may be defined by defining the neighbors having certain radio access technology and associated carrier frequency (e.g., or bandwidth). This limits the number of cells the UE 910 has to examine. Thus, the UE 910 may not have to examine signal levels of cells 930-1 through 930-3, 925-1, 925-2, and 920-1 through 920-3, and instead could examine only those RATs to which the UE is assigned. Further, the UE 910 may also examine the cells from the radio access technology to which the UE is camped and may examine other cells from other RATs when the cell from the camped radio access technology does not meet certain conditions (e.g., of signal strength). This would further reduce the amount of cells to be monitored.

Figure 10:
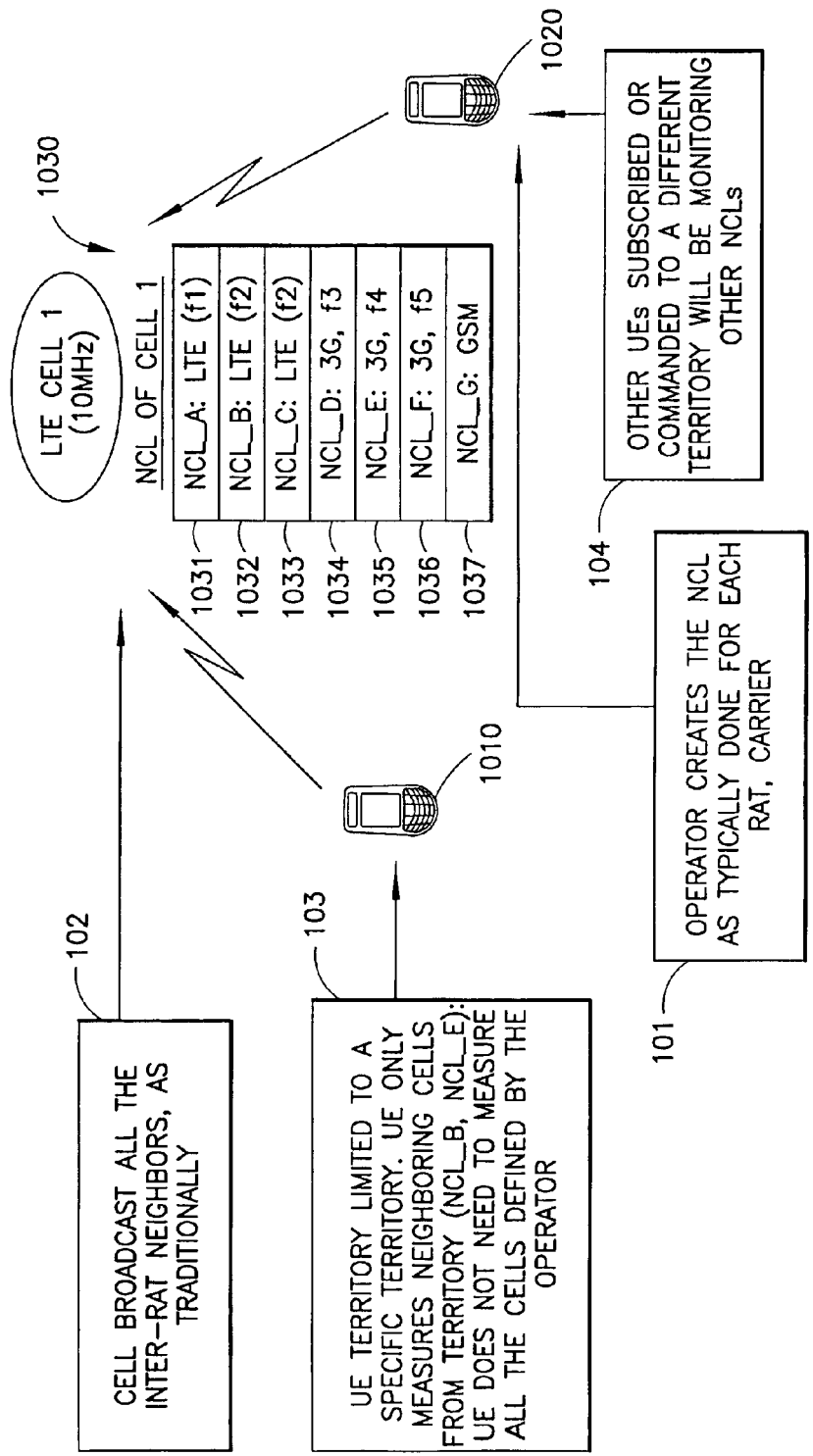
FIG. 10 illustrates how cell selection is facilitated in order to "camp" on a multi-layer wireless network and to reduce a neighboring cell list.

FIG. 10 is an example (e.g., use case) of facilitating cell selection camping on a multi-layer network and reducing the neighbors on the NCL. In block 101, the operator creates the NCL 1030, as is typically done for each radio access technology and carrier (e.g., as defined by a frequency). This NCL 1010 includes a number of "sub-NCLs" 1031-1037, each of which corresponds to a radio access technology and a frequency. In block 102, the cell (e.g., base station 12, 18 of FIG. 2) broadcasts the NCL 1030, containing all the RATs neighbors, as traditionally performed. It is noted that an access area includes a number of cells from different RATs. In block 103, a UE, such as UE 1010, has a specific territory (see FIG. 4) containing a predetermined number of RATs. Consequently in block 103, the UE 1010 measures only those neighbor cells from that territory, which in this example includes the sub-NCLs 1032 and 1035, which correspond to RATs LTE (f2) and 3G (f4), respectively. Accordingly, the UE 1010 sends the measurements to the cell, e.g., as a measurement report. Meanwhile, in block 104, the UE 1020 is subscribed/commanded to a different territory and will be monitoring other sub-NCLs in the sub-NCLs 1031-1037. The UE only moves to the cells of the RATs that belong to its assigned territory.

Figure 13:
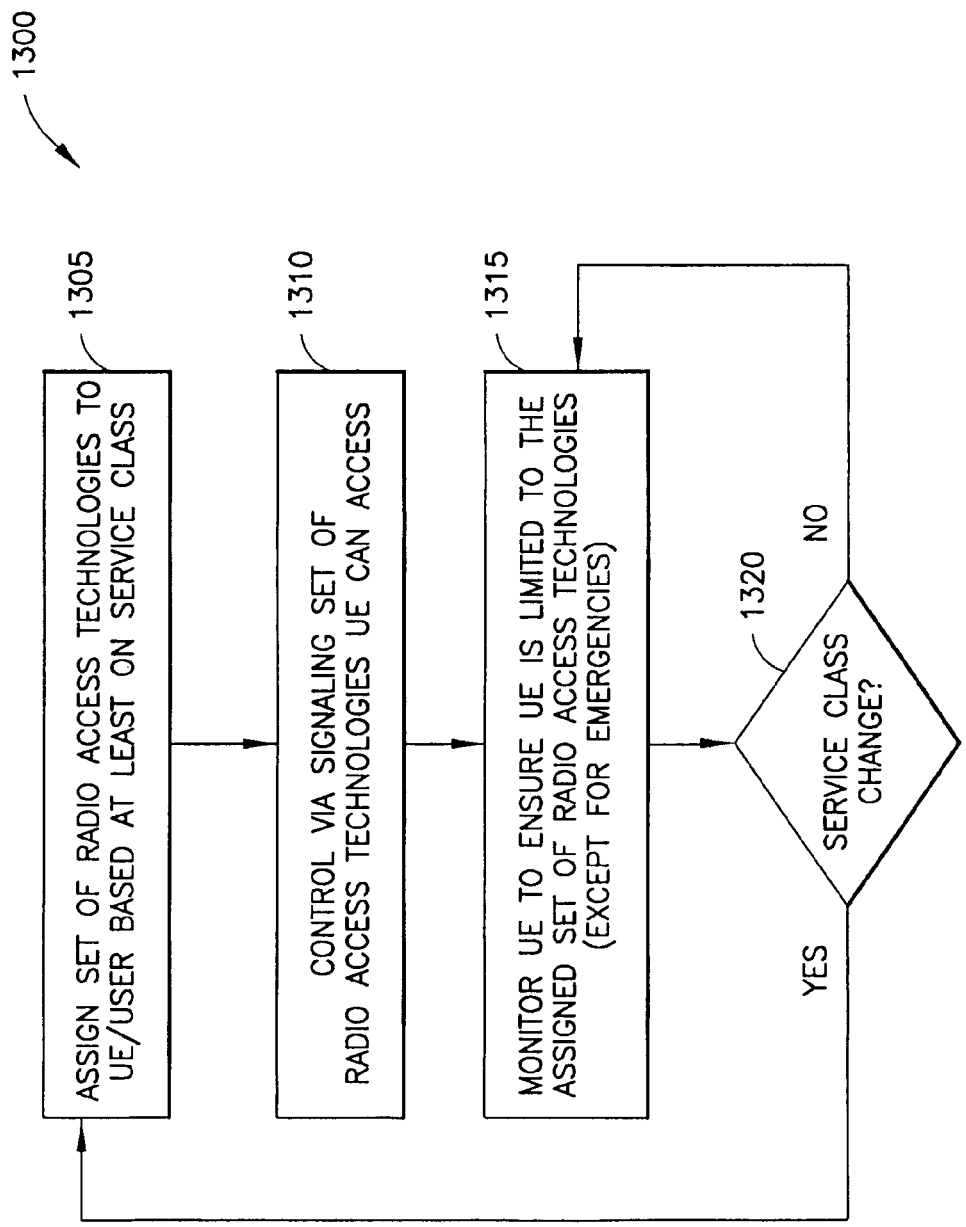
FIG. 13 is a flowchart of a method performed by a wireless network for operator controlled mobility for UE.

Referring now to FIG. 13, a method 1300 is shown that is performed by a wireless network (e.g., by the controller 14 and/or base station 12 of FIG. 2) for operator controlled mobility for UE. In block 1305, the wireless network assigns a set of RATs (e.g., a sub-network/territory as shown in FIGS. 4 and 7) to a UE (and an associated user, who will be billed for the services) based at least in part on a service class (e.g., as defined in "gold class 2" of FIG. 7). It is noted that the service class corresponds to service class criteria, such as bandwidth, QoS, or some combination thereof.

The wireless network controls the set of RATs to which the UE can access by signaling in block 1310. The signaling can include any data useful for determining which of a number of possible RATs is/are assigned to the UE. The UE is constrained to that assigned set of RATs. Block 1310 may be performed as shown in FIG. 12.

In block 1315, the wireless network monitors the UE to ensure that the UE remains constrained to its set of assigned RATs, except in emergency situations, such as when none of the assigned RATs are available. In block 1320, it is determined if there is a service class change. If so (block 1320=YES), method 1300 returns to block 1305. If not (block 1320=NO), the method 1300 continues in block 1315.

Figure 14:
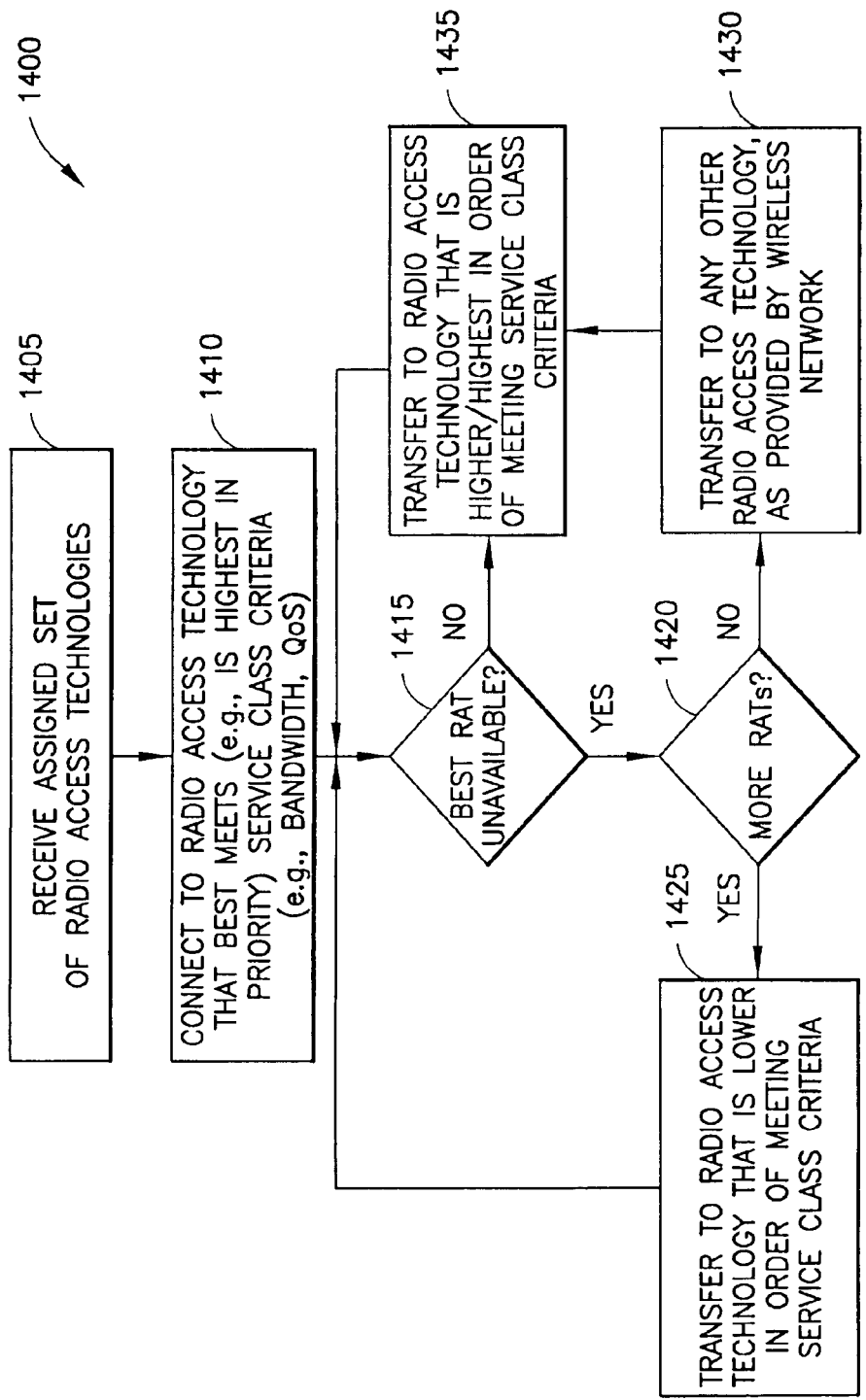
FIG. 14 is a flowchart of a method performed by a UE for operator controlled mobility.

Turning to FIG. 14, a method 1400 is shown that is performed by a UE for operator controlled mobility. Method 1400 begins in block 1405, where the UE receives via signaling an assigned set of RATs. In block 1410, the UE connects to the radio access technology that best meets service class criteria, typically defined using bandwidth but may include or be defined by other items such as QoS. It is noted that block 1410 can use a list of RATs sorted by priority in terms of ability to meet the service class criteria.

In block 1415, it is determined if the best radio access technology is unavailable. The radio access technology could be unavailable, e.g., if the access area (e.g., operated by the base station 12) into which the UE is transferred to does not contain the radio access technology or if the radio access technology for the current access area is experiencing interference or low power conditions. If so (block 1415=YES), it is determined in block 1415 if there are more RATs in the assigned set of RATs. If so (block 1420=YES), the UE transfers in block 1425 to the radio access technology that is lower in the order of meeting service class criteria. In an exemplary embodiment, the UE transfers to a radio access technology that is lower in priority than the currently used radio access technology. The method 1400 continues in block 1415.

If there are no additional RATs in the assigned set of RATs (block 1420=NO), the UE transfers to any other radio access technology that is provided by the wireless network (block 1430). This is an "emergency" situation, where no RATs in the assigned set are available. When this situation ends, the method 1400 continues in block 1435. Block 1435 may also be reached from block 1415 if it is determined that the best radio access technology is not unavailable (block 1415=NO). In block 1435, the UE transfers to a radio access technology that is higher (or the highest) in order of meeting the service class criteria.

Advantages of the operator controlled mobility include, but are not limited to, one or more of the following:
1) Operators are able to more fully utilize the different RATs currently available.
2) Increased service portfolio with new services having DSL-like offerings (e.g. broadband/high/low data rate) that can be introduced by operators, which also addresses customer needs.
3) Even if territories are not used, the operator controlled mobility can allow plug & play operations in the access network, as operators do not have to define specific neighbor cells for mobility reasons, but can instead only send the high level mobility instructions (e.g., which frequency and radio access technology to measure) to the UE.
4) No interference problems because the call is always assigned to the "best cell" in the target RAT/frequency band.
5) RATs with similar capabilities can be grouped into the same territory and offered to the subscriber as a set. Subscriber benefits include similar connection quality even if connection is provided across different RATs.

It is noted that if the assigned territory is limited to 3G and 2G, and if the normal cell reselection procedure includes the rule that "priority in 3G is the highest priority" then a UE will camp on 3G, if coverage is sufficient. The UE under this territory do not have to measure all the RATs. The best way to understand this is that an exemplary embodiment of this invention modifies (e.g., via signaling) the capability of the UE so that if the territory is limited to 3G and 2G, then the UE may be considered as supporting 2G and 3G only and therefore be constrained to 2G and 3G. Territory definitions include what specific frequencies and RATs to be tracked and thus power consumption impact is diminished.

UE measuring of other RATs is a requirement for self-configuration networks. Using operator controlled mobility, the UE would not be required to track RATs below the current territory nor would the UE be required to track RATs outside the defined territory for the UE. Therefore, the number of RATs to be tracked is limited and power can be preserved by not tracking additional RATs.

Figure 11:
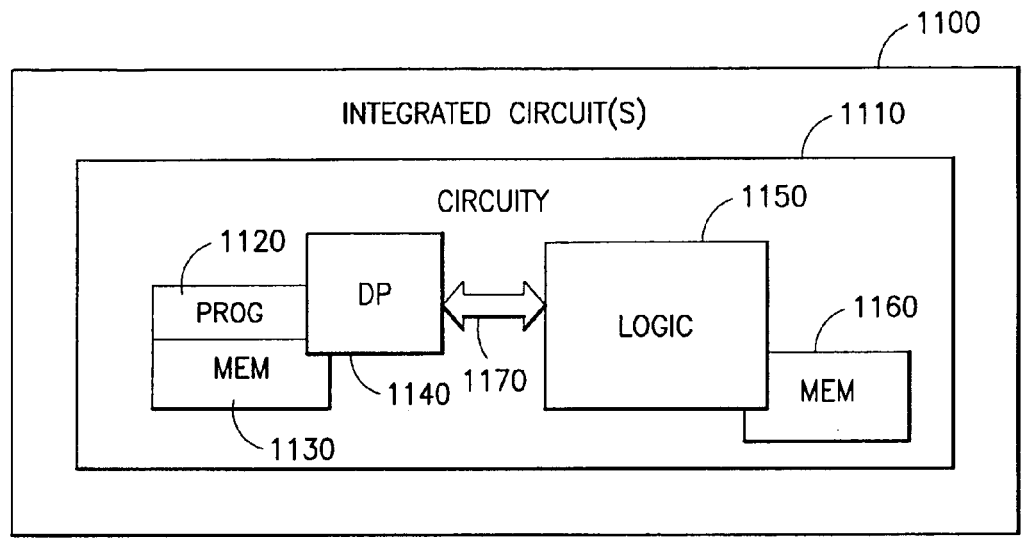
FIG. 11 is a block diagram of integrated circuits suitable for implementing embodiments of the disclosed invention.

In general, the various embodiments may be implemented in hardware such as special purpose circuits or software or any combination thereof. For example, some aspects may be implemented in hardware, while other aspects may be implemented in software (e.g., firmware) which may be executed by a data processor such as a controller, a microprocessor or other computing device, although the invention is not limited thereto. FIG. 11 shows one or more integrated circuits 1100 that comprise circuitry 1110 configured to perform the exemplary embodiments described herein. The circuitry 1110 comprises one or more data processors (DP) 1140, a program 1120 with instructions suitable for execution on the DP 1140, and a memory (MEM) 1130. The circuitry 1110 may also include logic 1150 designed to perform one or more of the techniques presented herein. The logic 1150 may have access to memory 1160. In this example, the logic 1150 is coupled to the DP 1140 through one or more buses 1170. As other examples, the processing unit 1110 comprises only the logic 1150 (e.g., with or without MEM 1160) or only the DP 1140 and an associated MEM 1130 having PROG 1120. Furthermore, discrete circuitry (e.g., not implemented on an integrated circuit) may also be used to implement portions of the disclosed invention.

While various aspects of the invention may be illustrated and described as block diagrams, flow charts, or using some other pictorial representation, it is well understood that these blocks, apparatus, systems, techniques or methods described herein may be implemented in, as non-limiting examples, hardware (e.g., special purpose circuits, logic, general purpose hardware, controllers, or other computing devices) or software (e.g., firmware) or some combination thereof.

Embodiments of the inventions may be practiced in various components such as integrated circuit modules (e.g., as shown in FIG. 11). The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

In one exemplary embodiment, a method is disclosed that includes assigning a set of RATs from a plurality of RATs to a UE based at least in part on a service class corresponding to the UE and signaling the set of RATs to the UE. The UE is therefore constrained (except in certain situations) to accessing that set of RATs. Additionally, the UE may be monitored to ensure that the UE is constrained to accessing only the assigned set of RATs. Furthermore, there may be instances where RATs other than the RATs in the assigned set are allowed to be accessed by the UE. In this case, the UE may only be allowed temporary access to RATs outside the assigned set.

In another exemplary embodiment, a network element comprises circuitry configured to assign a set of RATs from a plurality of RATs to a UE based at least in part on a service class corresponding to the UE, the circuitry also configured to signal the set of RATs to the UE.

In yet another exemplary embodiment, a computer program product is disclosed that tangibly embodies a program of machine-readable instructions, which are executable by at least one data processor to perform operations of assigning a set of RATs from a plurality of RATs to a UE based at least in part on a service class corresponding to the UE, and signaling the set of RATs to the UE.

In another exemplary embodiment, a method is disclosed that includes receiving via signaling a set of assigned RATs, and connecting to one of the assigned RATs that is determined to meet service class criteria. The assigned RATs may be sorted in a priority, e.g., from least likely to meet the service class criteria to most likely to meet the service class criteria. The service class criteria may include, e.g., bandwidth or QoS or some combination thereof. For instance, if bandwidth is being used as the service class criteria, the assigned RATs would be sorted from lowest bandwidth to highest bandwidth. An effort is made to select a radio access technology from the assigned RATs that best meets the service class criteria (e.g., the radio access technology offering the highest bandwidth or best QoS or some combination thereof is selected). Priority to the selected radio access technology is also made when transferring between access areas (e.g., as defined by cells corresponding to RATs). If the selected assigned radio access technology is not available, a radio access technology that comes closest, as compared to the best radio access technology, to meeting the service class criteria is chosen. When examining signals from a number of access areas, where each access area may offer different RATs, signals are examined from those RATs able to be accessed from the access areas. The non-assigned RATs able to be accessed from the access areas are not examined.

In another exemplary embodiment, a UE is disclosed that includes circuitry configured to receive via signaling a set of assigned RATs, the circuitry further configured to connect to one of the assigned RATs that is determined to meet service class criteria.

In yet another exemplary embodiment, a computer program product is disclosed that tangibly embodies a program of machine-readable instructions, which are executable by at least one data processor to perform operations of receiving via signaling a set of assigned RATs, and connecting to one of the assigned RATs that is determined to meet service class criteria.

An exemplary embodiment in accordance with this invention is a method for operator controlled mobility for UE. The method includes assigning a set of RATs from a plurality of RATs to a UE. The set of RATs is assigned based at least in part on a subscribed level of service corresponding to the UE. An indication of the assigned set of RATs is signaling to the UE.

In a further embodiment of the method as above the UE is constrained to accessing only RATs within the assigned set.

In another embodiment of the method as above the UE is enabled to temporarily access a radio access technology that is not in the set of RATs in given situations.

In a further embodiment of any of the methods as above, the method further includes monitoring to ensure that the UE is accessing only RATs within the assigned set. In another embodiment of any of the methods as above the set of RATs is prioritized by likelihood to meet at least one service class criteria. The at least one service class criteria corresponds to the subscribed level of service. The service class criteria may include bandwidth requirements and/or QoS requirements.

In another embodiment of any of the methods as above the method includes receiving measurement reports from the UE of the assigned set of RATs. A connection of the UE to a RAT may be initiated based upon the received measurements and the subscribed service class of the UE.

In a further embodiment of any of the methods as above, service class subscription information is stored in a HLR.

Another exemplary embodiment in accordance with this invention is an apparatus for operator controlled mobility for UE. The apparatus includes a processor to assign a set of RATs from a plurality of RATs to a UE. The set of RATs is assigned based at least in part on a subscribed level of service corresponding to the UE. The apparatus also includes a transmitter to signal an indication of the assigned set of RATs to the UE.

In a further embodiment of the apparatus as above, the apparatus further includes circuitry configured to monitor the UE to ensure that the UE is accessing only RATs within the assigned set.

In another embodiment of any of the apparatus as above, the apparatus further includes a processor to prioritize the set of RATs by likelihood to meet at least one service class criteria, wherein the at least one service class criteria corresponds to the subscribed level of service. The service class criteria may bandwidth requirements and/or QoS requirements. In further embodiment of any of the apparatus as above the plurality of RAT include GSM, 1.25 MHz LTE and/or 10 MHz LTE.

Another exemplary embodiment in accordance with this invention is an apparatus for operator controlled mobility for UE. The apparatus includes a processor to assign a set of RATs from a plurality of RATs to a UE. The set of RATs is assigned based at least in part on a subscribed level of service corresponding to the UE. The apparatus also includes a transmitter to signal an indication of the assigned set of RATs to the UE.

In a further embodiment of the apparatus as above, the apparatus further includes circuitry configured to monitor the UE to ensure that the UE is accessing only RATs within the assigned set.

In another embodiment of any of the apparatus as above, the apparatus further includes a processor to prioritize the set of RATs by likelihood to meet at least one service class criterion, wherein the at least one service class criterion corresponds to the subscribed level of service. The service class criterion may bandwidth requirements and/or QoS requirements.

In a further embodiment of any of the apparatus as above, the apparatus also includes a home location register to store service class subscription information.

A further exemplary embodiment in accordance with this invention is an apparatus for operator controlled mobility for UE. The apparatus includes a means for assigning a set of RATs from a plurality of RATs to a UE. The set of RATs is assigned based at least in part on a subscribed level of service corresponding to the UE. The apparatus also includes a means for signaling an indication of the assigned set of RATs In another embodiment of the apparatus as above, the means for assigning may be a computer processor. The means for signaling may be a transmitter.

A further exemplary embodiment in accordance with this invention is a computer-readable medium embodying a computer program for operator controlled mobility for UE. The computer program includes assigning a set of RATs from a plurality of RATs to a UE. The set of RATs is assigned based at least in part on a subscribed level of service corresponding to the UE. The computer program also includes signaling an indication of the assigned set of RATs to the UE.

A further exemplary embodiment in accordance with this invention is a method for controlling the UE. The method includes receiving a prioritized set of assigned RATs. A measurement report is generated for a subset of a NCL. The subset represents RATs in the NCL that are also in the set of assigned RATs. The measurement report is transmitted to a base station.

In a further embodiment of the method as above the set of assigned RATs is prioritized by likelihood to meet at least one service class criterion. In another embodiment of any of the methods as above, the service class criteria includes bandwidth requirements and/or QoS requirements.

In another embodiment of any of the methods as above, the subset is restricted to those RATs of equal or higher priority than the RAT with which the UE is currently connected. The subset may be examined according to the prioritization order of the set of assigned RATs.

In a further embodiment of any of the methods as above, the method also includes, in response to detecting none of the assigned RATs are available, measuring RATs in the NCL that are not in the set of assigned RATs.

In another embodiment of any of the methods as above, the method also includes, determining whether the measured RATs meets at least one service class criterion. In response to determining that none of the assigned RATs meet the at least one service class criterion, the UE may generate a measurement report for RATs in the NCL that are not in the set of assigned RATs. The at least one service class criterion may include bandwidth requirements and/or QoS requirements. The measurement report may indicate the strength of the signal and/or the ability of the signal to satisfy at least one service class criterion.

A further exemplary embodiment in accordance with this invention is an apparatus for using operator controlled mobility of user equipment. The apparatus includes a receiver to receive a prioritized set of assigned RATs. A processor generates a measurement report for a subset of a NCL. The subset represents RATs in the NCL that are also in the set of assigned RATs. The apparatus also includes a transmitter to transmit the measurement report to a base station.

In a further embodiment of the apparatus as above the set of assigned RATs is prioritized by likelihood to meet at least one service class criterion. The service class criteria includes bandwidth requirements and/or QoS requirements.

In another embodiment of any of the apparatus as above, the subset is restricted to those RATs of equal or higher priority than the RAT with which the UE is currently connected. The subset may be examined according to the prioritization order of the set of assigned RATs.

A further exemplary embodiment in accordance with this invention is an apparatus for using operator controlled mobility of user equipment. The apparatus includes a means for receiving a prioritized set of assigned RATs. A means for generating a measurement report for a subset of a NCL is also included. The subset represents RATs in the NCL that are also in the set of assigned RATs. The apparatus also includes a means for transmitting the measurement report to a base station.

In another embodiment of the apparatus as above, the means for receiving may be a radio receiver. The means for generating may be a processor and the means for transmitting may be a radio transmitter.

Another exemplary embodiment in accordance with this invention is a computer-readable medium embodying a computer program for operator controlled mobility for UE. The computer program includes receiving a set of assigned RATs. A measurement report is generated for a subset of a NCL. The subset represents RATs in the NCL that are also in the set of assigned RATs. The computer program also includes instructions to transmit the measurement report to a base station.

The foregoing description has provided by way of exemplary and non-limiting examples a full and informative description of the best techniques presently contemplated by the inventors for carrying out embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the scope of this invention.

Furthermore, some of the features of exemplary embodiments of this invention could be used to advantage without the corresponding use of other features. As such, the foregoing description should be considered as merely illustrative of the principles of embodiments of the present invention, and not in limitation thereof.

The invention claimed is:

1. A method comprising:
assigning to a user equipment, by a network device, at least one radio access technology territory from a plurality of radio access technology territories of a home sub-network of the user equipment based at least in part on a subscribed service class corresponding to the user equipment;
prioritizing, by the network device, the assigned at least one radio access technology territory based on a capability to meet at least one service class criterion, wherein the at least one service class criterion corresponds to the subscribed service class, and wherein the at least one service class criterion comprises at least one of bandwidth requirements and quality of service requirements;
signaling, by the network device, an indication of the assigned at least one radio access technology territory to the user equipment, where the indication causes the user equipment to be constrained to accessing only radio access technology territories of the assigned at least one radio access technology territory;
monitoring the user equipment such that the user equipment is accessing only radio access technology territories within the assigned at least one radio access technology territory; and
based on at least the monitoring, granting the user equipment access to a radio access technology territory of the assigned at least one radio access technology territory of the home sub-network, where each of the at least one radio access technology territory is a sub-network of the home sub-network, where the at least one radio access territory is subscription based, and where the user equipment is constrained to accessing only territories of the at least one radio access territory to which the user equipment is subscribed.

2. The method of claim 1, where prioritizing the assigned at least one radio access technology based on a capability of each territory of the set of assigned radio access technology territories to meet at least one service class criterion comprises sorting the assigned at least one radio access technology territory from least likely to meet the at least one service class criterion to most likely to meet the at least one service class criterion.

3. The method of claim 1, where the at least one service class criterion comprises bandwidth requirements, and where prioritizing the assigned at least one radio access technology territory based on a capability of each territory of the assigned at least one radio access technology territory to meet at least one service class criterion comprises sorting the assigned at least one radio access technology territory from lowest bandwidth to highest bandwidth capability.

4. The method of claim 1, where the indication comprises a list of the selected radio access technology territories of the home sub-network sorted using the prioritization.

5. The method of claim 1, comprising:
receiving, by the network device, an indication that none of the assigned at least one radio access technology territory is available for access; and
in response to the indication, granting the user equipment temporary access to an unassigned radio access technology.

6. A non-transitory computer readable medium tangibly encoded with a computer program executable by a processor to perform actions comprising:
assigning to a user equipment at least one radio access technology territory from a plurality of radio access technology territories of a home sub-network of the user equipment based at least in part on a subscribed service class corresponding to the user equipment;

prioritizing the assigned at least one radio access technology territory based on a capability of each of the at least one radio access technology territory to meet at least one service class criterion, wherein the at least one service class criterion corresponds to the subscribed service class, and wherein the at least one service class criterion comprises at least one of bandwidth requirements and quality of service requirements;

signaling an indication of the assigned at least one radio access technology territory to the user equipment, where the indication causes the user equipment to be constrained to accessing only radio access technology territories of the assigned at least one radio access technology territory; and monitoring the user equipment such that the user equipment is accessing only radio access technology territories within the assigned at least one radio access technology territory; and based on at least the monitoring, granting the user equipment access to a radio access technology territory of the assigned at least one radio access technology territory of the home sub-network, where each of the at least one radio access technology territory is a sub-network of the home sub-network, where the at least one radio access territory is subscription based, and where the user equipment is constrained to accessing only territories of the at least one radio access territory to which the user equipment is subscribed.

7. An apparatus comprising:
at least one processor; and
at least one memory including computer program code, the at least one memory and the computer program code configured to, with the at least one processor, cause the apparatus to perform at least the following:

to assign to a user equipment at least one radio access technology territory from a plurality of radio access technology territories of a home sub-network of the user equipment based at least in part on a subscribed service class corresponding to the user equipment;

to prioritize the assigned at least one radio access technology territory based on a capability of each of the at least one radio access technology territory to meet at least one service class criterion, wherein the at least one service class criterion corresponds to the subscribed service class, and wherein the at least one service class criterion comprises at least one of bandwidth requirements and quality of service requirements;

to signal an indication of the assigned at least one radio access technology to the user equipment, where the indication causes the user equipment to be constrained to accessing only radio access technology territories of the assigned at least one radio access technology territory; and to monitor the user equipment such that the user equipment is accessing only radio access technology territories within the assigned at least one radio access technology territory; and to, based on at least the monitoring, grant the user equipment access to a radio access technology territory of the assigned at least one radio access technology territory of the home sub-network, where each of the at least one radio access technology territory is a sub-network of the home sub-network, where the at least one radio access territory is subscription based, and where the user equipment is constrained to accessing only territories of the at least one radio access territory to which the user equipment is subscribed.

8. The apparatus of claim 7, embodying a home location register configured to store service class subscription information.

9. The apparatus according to claim 7, wherein the at least one memory and the computer program code are further configured to cause the apparatus to initiate a connection of the user equipment to a radio access technology territory based at least upon a received measurement report from the user equipment of the assigned at least one radio access technology and the subscribed service class of the user equipment.

10. A method comprising:
receiving, at a user equipment, an indication of a prioritized set of assigned radio access technology territories of a home sub-network of the user equipment, where the prioritized set of radio access technology territories are prioritized based on a capability of each territory of the set of assigned radio access technology territories to meet at least one service class criterion, the at least one service class criterion corresponds to a subscribed service class corresponding to the user equipment, and wherein the at least one service class criterion comprises at least one of bandwidth requirements and quality of service requirements, wherein the indication causes the user equipment to be constrained to accessing only radio access technology territories of the assigned radio access technology territories;

based on the received prioritized set of assigned radio access technology territories, generating a measurement report for a subset of a neighbor cell list, wherein the subset represents radio access technology territories in the neighbor cell list that are also in the set of assigned radio access technology territories of the home sub-network, wherein each of the radio access technology territories is a sub-network of the home sub-network, wherein the radio access territories are subscription based, and wherein the user equipment is constrained to accessing only territories of the radio access territories to which the user equipment is subscribed; and transmitting the measurement report to a base station.

11. The method of claim 10, comprising: based on at least the measurement report, accessing a radio access technology territory of the assigned at least one radio access technology territory of the prioritized set of assigned radio access technology territories.

12. The method of claim 10, wherein the subset is further restricted to only those radio access technology territories that include a radio access technology with which the user equipment is currently connected.

13. A non-transitory computer readable medium tangibly encoded with a computer program executable by a processor to perform actions comprising:

receiving, at a user equipment, an indication of a prioritized set of assigned radio access technology territories of a home sub-network of the user equipment, where the prioritized set of radio access technology territories are prioritized based on a capability of each territory of the set of assigned radio access technology territories to meet at least one service class criterion, the at least one service class criterion corresponds to a subscribed service class corresponding to the user equipment, wherein the at least one service class criterion comprises at least one of bandwidth requirements and quality of service requirements, and wherein the indication causes the user equipment to be constrained to accessing only radio access technology territories of the assigned radio access technology territories;

generating a measurement report for a subset of a neighbor cell list, wherein the subset represents radio access technologies in the neighbor cell list that are also in the set of assigned radio access technology territories of the home sub-network, wherein each of the radio access technology territories is a sub-network of the home sub-network, wherein the radio access territories are subscription based, and wherein the user equipment is constrained to accessing only territories of the at least one radio access territory to which the user equipment is subscribed; and transmitting the measurement report to a base station.

14. An apparatus comprising:

at least one processor; and at least one memory including computer program code, the at least one memory and the computer program code configured to, with the at least one processor, cause the apparatus to perform at least the following:

receive an indication of a prioritized set of assigned radio access technology territories of a home sub-network of a user equipment, where the prioritized set of radio access technologies are prioritized based on a capability of each territory of the set of assigned radio access technology territories to meet at least one service class criterion, the at least one service class criterion corresponds to a subscribed service class corresponding to the apparatus, and wherein the at least one service class criterion comprises at least one of bandwidth requirements and quality of service requirements, where the indication causes the user equipment to be constrained to accessing only radio access technology territories of the assigned radio access technology territories;

in response to the receiving, generate a measurement report for a subset of a neighbor cell list, wherein the subset represents radio access technologies in the neighbor cell list that are also in the set of assigned radio access technology territories of the home sub-network, where each of the radio access technology territories is a sub-network of the home sub-network, where the radio access territories are subscription based, and where the user equipment is constrained to accessing only territories of the at least one radio access territory to which the user equipment is subscribed;

transmit the measurement report to a base station.

15. The apparatus according to claim 14, wherein the subset is further restricted to only those radio access technology territories that include a radio access technology with which the user equipment is currently connected.

16. The apparatus according to claim 14, wherein the subset is examined according to the prioritization order of the set of assigned radio access technology territories.

17. The apparatus according to claim 14, wherein the at least one memory and the computer program code are further configured to cause the apparatus to generate a measurement report for radio access technologies in the neighbor cell list that are not in the set of assigned radio access technology territories, in response to detecting none of the assigned radio access technology territories are available.

18. The apparatus according to claim 14, wherein the at least one memory and the computer program code are further configured to cause the apparatus to generate a measurement report for radio access technologies in the neighbor cell list that are not in the set of assigned radio access technology territories, in response to a determination that none of the assigned radio access technology territories meet the at least one service class criterion.

* * * * *